United States Patent
Amari et al.

(10) Patent No.: US 11,174,569 B2
(45) Date of Patent: Nov. 16, 2021

(54) ULTRAFINE FIBER PRODUCTION METHOD

(71) Applicant: KAO CORPORATION, Tokyo (JP)

(72) Inventors: Naomi Amari, Ichikai-machi (JP); Takehiko Tojo, Utsunomiya (JP); Koji Saito, Utsunomiya (JP); Hiroya Suzuki, Utsunomiya (JP); Keitaro Yoneta, Utsunomiya (JP); Kenta Mukai, Utsunomiya (JP)

(73) Assignee: KAO CORPORATION, Tokyo (JP)

( * ) Notice: Subject to any disclaimer, the term of this patent is extended or adjusted under 35 U.S.C. 154(b) by 554 days.

(21) Appl. No.: 16/092,704

(22) PCT Filed: Apr. 7, 2017

(86) PCT No.: PCT/JP2017/014440
§ 371 (c)(1),
(2) Date: Oct. 10, 2018

(87) PCT Pub. No.: WO2017/179494
PCT Pub. Date: Oct. 19, 2017

(65) Prior Publication Data
US 2019/0127885 A1    May 2, 2019

(30) Foreign Application Priority Data

Apr. 11, 2016   (JP) .............................. JP2016-079183
Apr. 5, 2017    (JP) .............................. JP2017-075207

(51) Int. Cl.
*D01D 5/00*   (2006.01)
*D04H 1/728*  (2012.01)
(Continued)

(52) U.S. Cl.
CPC ............ *D01D 5/0023* (2013.01); *C08J 3/201* (2013.01); *D01D 1/04* (2013.01); *D01D 5/0092* (2013.01);
(Continued)

(58) Field of Classification Search
CPC ... D01D 5/0007; D01D 5/0015; D01D 5/0023
See application file for complete search history.

(56) References Cited

U.S. PATENT DOCUMENTS 4,789,504 A * 12/1988 Ohmori .............. B01D 39/1623
                                                    264/436
2003/0189167 A1* 10/2003 Schultz ............... H01J 49/0018
                                                    250/281
(Continued)

FOREIGN PATENT DOCUMENTS

CN         101805938 A        8/2010
CN         102144058 A        8/2011
(Continued)

OTHER PUBLICATIONS

Extended European Search Report, dated Oct. 10, 2019, for European Application No. 17782310.1.
International Search Report (PCT/ISA/210) issued in PCT/JP2017/014440, dated May 9, 2017.

*Primary Examiner* — Timothy Kennedy
(74) *Attorney, Agent, or Firm* — Xsensus LLP

(57) ABSTRACT

A method for producing ultrafine fibers of the present invention includes forming an electric field between an discharging nozzle from which a raw resin is discharged and a charging electrode which is disposed apart from the discharging nozzle, and supplying the raw resin which has been heated and melted into the electric field from the discharging nozzle to spin the raw resin. The raw resin is a resin mixture which contains a resin having a melting point and an additive, and satisfies a relation (I) below:

$$A/B \geq 1.0 \times 10^2 \quad (I)$$

wherein A represents the absolute value ($\Omega$) of electrical impedance of the raw resin at 50° C., and B represents the (Continued)

absolute value (Ω) of electrical impedance of the raw resin at a temperature 50° C. higher than a melting point of the raw resin.

20 Claims, 3 Drawing Sheets

(51) Int. Cl.
    *C08J 3/20*     (2006.01)
    *D01D 1/04*     (2006.01)
    *D01F 1/02*     (2006.01)
    *D01F 8/06*     (2006.01)
    *D01F 8/14*     (2006.01)
    *D01F 6/46*     (2006.01)
    *D01F 6/92*     (2006.01)
    *D01F 6/62*     (2006.01)
    *D01F 6/06*     (2006.01)

(52) U.S. Cl.
    CPC ................ *D01F 1/02* (2013.01); *D01F 8/06* (2013.01); *D01F 8/14* (2013.01); *D04H 1/728* (2013.01); *D01D 5/0069* (2013.01); *D01F 6/06* (2013.01); *D01F 6/46* (2013.01); *D01F 6/62* (2013.01); *D01F 6/92* (2013.01); *D10B 2321/022* (2013.01); *D10B 2331/04* (2013.01)

(56) References Cited

U.S. PATENT DOCUMENTS

| | | |
|---|---|---|
| 2006/0213829 A1 | 9/2006 | Rutledge et al. |
| 2007/0042069 A1* | 2/2007 | Armantrout ............. D04H 1/56 |
| | | 425/174.8 R |
| 2008/0193732 A1* | 8/2008 | Chen ........................ D01F 6/44 |
| | | 428/220 |
| 2010/0297443 A1 | 11/2010 | Kamisasa et al. |
| 2011/0177395 A1 | 7/2011 | Kamisasa |
| 2012/0315225 A1 | 12/2012 | Porbeni et al. |
| 2013/0115456 A1* | 5/2013 | Wagner ................ D01D 5/0007 |
| | | 428/394 |
| 2015/0198904 A1* | 7/2015 | Kikuchi ............. G03G 15/0818 |
| | | 492/18 |

FOREIGN PATENT DOCUMENTS

| | | |
|---|---|---|
| JP | 59-204957 A | 11/1984 |
| JP | 2007-239114 A | 9/2007 |
| JP | 2007-321246 A | 12/2007 |
| JP | 2009-150039 A | 7/2009 |
| JP | 2013-64203 A | 4/2013 |
| JP | 2013-520583 A | 6/2013 |
| JP | 2015-161051 A | 9/2015 |
| JP | 2015-178692 A | 10/2015 |
| JP | 2015-209600 A | 11/2015 |
| JP | 2015-209601 A | 11/2015 |
| JP | 2017-190533 A | 10/2017 |

\* cited by examiner

ULTRAFINE FIBER PRODUCTION METHOD

TECHNICAL FIELD

The present invention relates to a method for producing ultrafine fibers using electrospinning.

BACKGROUND ART

Electrospinning is typically used to produce nanofibers. Electrospinning forms fibers by applying a high voltage to a solution or melt of a resin serving as a raw material of nanofibers. In electrospinning that employs a resin solution, the resin solution is placed in a syringe, and a high voltage is applied between a nozzle that is attached to a leading end of the syringe and a collector that is positioned at a predetermined distance from the nozzle. The resin solution is discharged from the syringe. In this process, a solvent evaporates, and the resin, which is a solute, solidifies. Meanwhile, the resin forms nanofibers while being stretched and deformed due to a potential difference, and is attracted to a collector. This method requires evaporation of the solvent, and therefore, it is not easy to increase the production efficiency. Moreover, the need to collect the evaporated solvent may increase the production cost. Furthermore, it is extremely difficult to apply this method to resins, such as, for example, polyethylene and polypropylene, that have a property of not being easily dissolved in a solvent.

In contrast, melt electrospinning, which employs resin melt, does not use a solvent, and therefore does not cause the above-described problems that may occur in the case where a resin solution is employed. For this reason, various proposals regarding melt electrospinning have recently been made (see Patent Literatures 1 to 3, for example).

CITATION LIST

Patent Literatures

Patent Literature 1: JP 2007-239114A
Patent Literature 2: JP 2007-321246A
Patent Literature 3: JP 2013-064203A

SUMMARY OF INVENTION

The present invention provides a method for producing, ultrafine fibers, the method including forming an electric field between an discharging nozzle from which a raw resin is discharged and a charging electrode which is disposed apart from the discharging nozzle, and supplying the raw resin which has been heated and melted into the electric field from the discharging nozzle, to spin the raw resin. The raw resin of the present invention is a resin mixture which contains a resin having a melting point and an additive, and satisfies a relation (I) below:

$$A/B \geq 1.0 \times 10^2 \qquad (I)$$

wherein A represents an absolute value (Ω) of electrical impedance of the raw resin at 50° C., and B represents an absolute value (Ω) of electrical impedance of the raw resin at a temperature 50° C. higher than a melting point of the raw resin.

DESCRIPTION OF EMBODIMENTS

Conventionally, synthetic fibers, such as polyethylene terephthalate (PET) fibers, polyamide fibers, and polyolefin fibers, are produced typically using melt spinning. However, it is difficult to stably produce ultrafine fibers using melt spinning.

On the other hand, in conventional melt electrospinning techniques such as those disclosed in Patent Literatures 1 to 3, polymeric resins cannot be easily spun into ultrafine fibers even when a high voltage is applied, since polymeric resins are generally not easily charged by electrostatic induction. Therefore, it has been difficult to apply polymeric resins to melt electrospinning.

The present invention relates to an improvement in an ultrafine fiber production method, and more particularly relates to a method for producing ultrafine fibers of a polymeric resin by using melt electrospinning.

Figure 1:
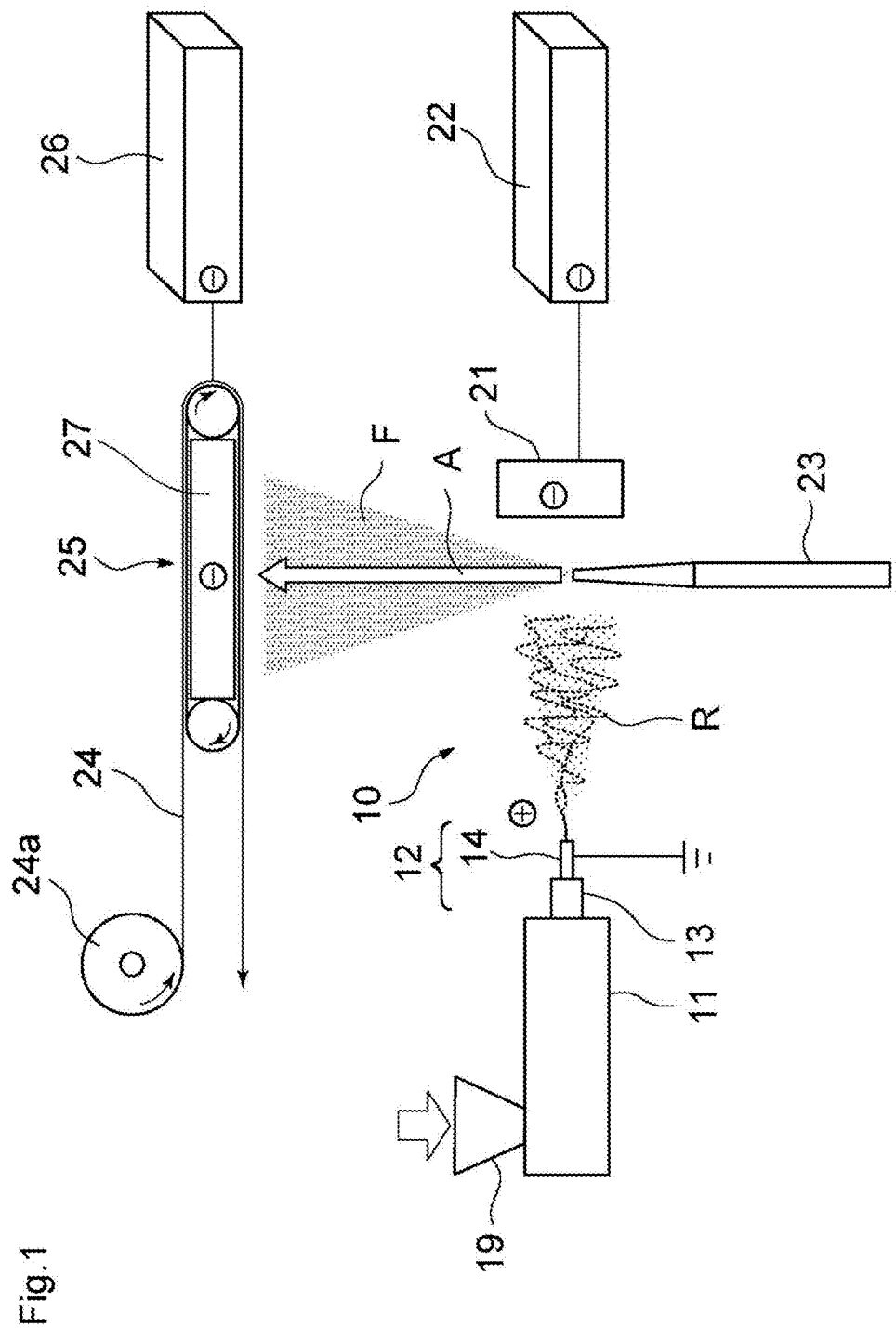
FIG. 1 is a schematic diagram illustrating a method for producing ultrafine fibers using a melt electrospinning apparatus.

Hereinafter, the present invention will be described based on a preferred embodiment. FIG. 1 schematically shows an example of an apparatus 10 that is preferably used in the production method of the present invention. The melt electrospinning apparatus 10 shown in FIG. 1 has a molten resin supply portion including a housing 11 that is provided with an discharging nozzle 12 from which a raw resin is discharged and a hopper 19 to which the raw resin is supplied; and an electrode portion including a charging electrode 21 that is positioned in such a manner to face the discharging nozzle 12 and spaced apart therefrom and a high-voltage generator 22 that is connected to the charging electrode 21. The discharging nozzle 12 includes a nozzle base 13 and a leading end portion 14 of the discharging nozzle 12. Being spaced apart means that the leading end portion 14 and the charging electrode 21 are spaced apart from each other. The leading end portion 14 is provided with an earth connection and is earthed. The apparatus 10 of the present embodiment includes a fluid jetting portion 23 on the lower side in FIG. 1 relative to an imaginary straight line that connects the molten resin supply portion and the electrode portion, and also includes a collecting portion that collects raw resin fibers, the collecting portion being located at a position that is on the upper side relative to the imaginary straight line and that faces the fluid jetting portion 23. The apparatus 10 as a whole constitutes an ultrafine fiber production apparatus. In the collecting portion, a collecting sheet 24 is disposed on a transport conveyor 25, and the collecting sheet 24 is supplied onto the transport conveyor 25 from a raw collecting sheet 24a in the form of a roll. Moreover, the collecting portion is connected to the high-voltage generator 26, or is connected to an earth ground and electrically connected the earth.

As described above, in the melt electrospinning apparatus 10, the charging electrode 21 is positioned at a predetermined distance from the leading end portion 14 of the discharging nozzle 12 in such a manner to face the leading end portion 14. This configuration allows the leading end portion 14 to be charged by electrostatic induction from the charging electrode 21 to which a high voltage is applied. The use of electrostatic induction to charge the leading end portion 14 eliminates a factor that may cause trouble due to wires coming into contact with each other. As a result, sparking to the leading end portion 14 and the housing 11 can be reduced. In particular, sparking to the leading end portion 14 and the housing 11 can be reduced even further by providing the leading end portion 14 with an earth connection. Preferably, the charging electrode 21 is covered with a dielectric material.

The raw resin is loaded into the hopper 19 that is attached to the housing 11 of the melt electrospinning apparatus 10. Specifically, the raw resin in pellet form is loaded into the hopper 19, and the raw resin is supplied into a cylinder (not shown) by rotating a screw (not shown) that is installed in the housing 11. The raw resin pellets supplied into the cylinder advance in the direction of the axis of rotation of the screw while gradually melting as a result of being exposed to heat and a shearing force between an inner wall of the cylinder and the screw. Then, the molten raw resin is discharged from a discharging port of the leading end portion 14. The leading end portion 14 and the discharged raw resin are charged by electrostatic induction caused by a negative potential that is applied to the charging electrode 21 by the high-voltage generator 22. The charged raw resin is attracted toward the charging electrode 21 while being still in a molten state. At that time, the raw resin is elongated and becomes extremely thin. From the viewpoint of effectively performing the elongation of the raw resin, the fluidity index (MFR) of the discharged raw resin at the outlet port of the leading end portion 14 is set at preferably 10 g/min or greater and more preferably 100 g/min or greater. The fluidity index (MFR) is measured in accordance with JIS K7210-1999. For example, if the raw resin is polypropylene, the fluidity index is measured using a die with a hole diameter of 2.095 mm and a length of 8 mm at 230° C. under a load of 2.16 kg.

The leading end portion 14 of the discharging nozzle 12 is heated by, for example, heat that is transferred from a band heater (not shown) attached to the nozzle base 13 and heat that is transferred from the molten raw resin inside the leading end portion 14. The heating temperature of the raw resin in the leading end portion 14 depends on the type of the raw resin, but is preferably 100° C. or higher and more preferably 200° C. or higher, and is preferably 400° C. or lower and more preferably 350° C. or lower.

In the ultrafine fiber production method of the present embodiment, a voltage is applied between the discharging nozzle 12 and the charging electrode 21 or a collecting electrode 27. From the viewpoint of sufficiently charging the raw resin in the molten state, the applied voltage is preferably 5 kV or greater and more preferably 10 kV or greater, is preferably 100 kV or less and more preferably 80 kV or less, and is preferably from 5 to 100 kV and more preferably from 10 to 80 kV. When the applied voltage is within this range, the flow of electrons between the discharging nozzle 12 and the charging electrode 21 or the collecting electrode 27 is favorable, and the raw resin in the molten state can be easily charged. Moreover, sparks and corona discharges are less likely to occur between the discharging nozzle 12 and the charging electrode 21 or the collecting electrode 27, and a malfunction of the apparatus is less likely to occur. Furthermore, being able to apply a high voltage that falls within the above-described range contributes to an increase in the amount of electric charge on the raw resin in the molten state. The increase in the amount of electric charge on the raw resin in the molten state can make target fibers even thinner and increase the fiber production efficiency, and is thus extremely advantageous.

The distance between the discharging nozzle 12 and the charging electrode 21 can be selected as appropriate, with consideration of the fiber diameter (diameter) of ultrafine fibers to be obtained, the variation in the fiber diameter, and the ease of accumulation of the ultrafine fibers on the collecting electrode 27. For example, the distance between the discharging nozzle 12 and the charging electrode 21 is preferably 10 mm or greater and more preferably 30 mm or greater, is preferably 150 mm or less and more preferably 75 mm or less, and is preferably from 10 to 150 mm and more preferably from 30 to 75 mm. When the distance between the discharging nozzle 12 and the charging electrode 21 is within this range, the flow of electrons between the discharging nozzle 12 and the charging electrode 21 is less likely to be prevented, and the raw resin in the molten state can be easily charged. Moreover, sparks and corona discharges are less likely to occur between the discharging nozzle 12 and the charging electrode 21 or the collecting electrode 27, and a malfunction of the apparatus is less likely to occur.

In the melt electrospinning apparatus 10 used in the present embodiment, regardless of the shape of the charging electrode 21, the leading end portion 14 of the discharging nozzle 12 protrudes, and thus, the electric charge can be concentrated on the leading end portion 14 without dispersing the electric charge to a metal portion other than the leading end portion 14. For example, in the case where the charging electrode 21 has a flat plate-like shape shown in FIG. 1, the charging electrode 21 is disposed such that the leading end portion 14 is located near a central portion of a surface of the charging electrode 21 that faces the leading end portion 14, and thus, the leading end portion 14 and the raw resin R in the molten state can be stably charged without dispersing the electric charge to a metal portion other than the leading end portion 14.

The nozzle base 13 that is connected to the housing 11 and the leading end portion 14 are composed of a material that is capable of withstanding heat and pressure, and are typically made of metal. That is to say, the nozzle base 13 and the leading end portion 14 are composed of a conductive material. The nozzle base 13 and the leading end portion 14 are electrically insulated from each other with an insulating member (not shown). Therefore, during operation of the melt electrospinning apparatus 10, even when a high voltage is applied to the leading end portion 14 using the charging electrode 21, the insulating effect of the insulating member prevents the voltage from being directly applied to the housing 11.

From the viewpoint of concentrating the electric charge on the leading end portion 14, it is preferred that the ratio of the surface area of the charging electrode 21 to the surface area of the leading end portion 14 is large.

An air stream A flows between the tip of the leading end portion 14 and the charging electrode 21 in a direction at an angle, more preferably orthogonal, to a direction that connects the leading end portion 14 and the charging electrode 21. This air stream A is blown from the jetting portion 23. After being discharged from the leading end portion 14 and before reaching the charging electrode 21, the raw resin R in the molten state is entrained by the air stream A, and thus, the flying direction thereof changes. As a result of being entrained by the air stream A, the raw resin R is elongated even further and becomes even more thinner. For this purpose, it is preferable to use air, which serves as a heated fluid, as the air stream A. The temperature of the heated air depends on the type of the raw resin R, but is preferably 100° C. or higher and more preferably 200° C. or higher, and is preferably 500° C. or lower and more preferably 400° C. or lower. For example, the temperature of the heated air is preferably from 100 to 500° C. and more preferably from 200 to 400° C. For the same purpose, the flow rate of the air stream A at the jetting port of the jetting portion 23 when jetting the air stream A is preferably 50 L/min or greater and more preferably 150 L/min or greater, and is preferably 350 L/min or less and more preferably 250 L/min or less. For example, the flow rate of the air stream A is preferably from 50 to 350 L/min and more preferably from 150 to 250 L/min.

Fibers F that are formed as a result of being entrained and elongated by the air stream A are collected on the collecting sheet 24. The collecting sheet 24 can be long band-shaped, for example. The long band-shaped collecting sheet 24 is drawn out from the raw collecting sheet 24a and transported by the transport conveyor 25. The collecting electrode 27 is disposed inside the transport conveyor. The high-voltage generator 26 is connected to the collecting electrode 27, and a high voltage is applied to the collecting electrode 27 by the high-voltage generator 26. As a result of the application of a high voltage to the collecting electrode 27, the transport conveyor 25 and the collecting sheet 24 on the transport conveyor 25 are negatively charged. Thus, the fibers F are attracted to the transport conveyor 25 and accumulate on a surface of the collecting sheet 24. The collecting electrode 27 may be connected to an earth ground, instead of being connected to the high-voltage generator 26.

Fibers F that are produced using the above-described various types of resins as raw materials can have various thicknesses in accordance with the conditions under which melt electrospinning is performed. In particular, ultrafine fibers that are called nanofibers can be produced. Ultrafine fibers as used herein refer to fibers typically having a thickness from 10 to 3000 nm and more preferably from 10 to 1000 nm, in terms of the circle equivalent diameter. The thickness of ultrafine fibers can be determined by, for example; observing the fibers at a magnification of 10000 through observation under a scanning electron microscope (SEM); arbitrarily selecting ten fibers, except for defects such as clumps of ultrafine fibers, intersecting portions of ultrafine fibers, and polymer droplets, from a two-dimensional image created by the scanning electron microscope; and directly measuring the fiber diameter by drawing a line perpendicular to the longitudinal direction of each of the selected fibers.

The principle of melt electrospinning of the present invention is considered to be as follows. Melt electrospinning of the present invention is broadly divided into a step in which the raw resin in the molten state is elongated and a step in which the raw resin in a solid state is collected as fibers. More specifically, the raw resin that has been heated and melted has a decreased absolute value of electrical impedance in its molten state and is sufficiently charged in the discharging nozzle. The raw resin that is then discharged from the discharging nozzle is elongated due to electric attraction from the charging electrode. The elongated raw resin is repeatedly elongated due to the aforementioned attraction and self-repulsion and thus made into ultrafine fibers. The raw resin that has been made into ultrafine fibers is in a solid state as a result of sudden cooling and a resulting temperature decrease in the process of being made into ultrafine fibers. When the raw resin solidifies, the absolute value of electrical impedance increases, and thus, it is possible to suppress leakage of the electric charge and maintain the charged state.

The ultrafine fibers that have been produced through melt electrospinning can be regarded as being a single continuous fiber between the discharging nozzle 12 and the collecting sheet 24. It is conceivable that, even if the fiber temporarily breaks due to the production conditions, the surrounding environment, or the like, the broken pieces of fiber immediately come into contact with each other, and, consequently, the ultrafine fibers look like a single continuous fiber between the discharging nozzle 12 and the collecting sheet 24.

The inventors of the present invention have studied a method for efficiently charging a raw resin in a molten state in melt electrospinning, and thereby spinning ultrafine fibers that have conventionally been difficult to obtain.

In melt electrospinning, typically, a raw resin is charged while passing through the discharging nozzle 12, and the charged raw resin is rapidly stretched toward the collecting electrode due to electric attraction. Moreover, the raw resin is also elongated due to self-repulsion caused by its own electric charge. However, like polypropylene (PP), which has conventionally been used in melt spinning techniques such as melt blowing, a non-conductive raw resin with a high electrical resistance value (volume-specific resistance value) is not easily charged even when an electric field is applied thereto, and therefore, it is difficult to make such a raw resin into ultrafine fibers.

Electrospinning is based on a mechanism in which a raw resin is charged and made into nanofibers using the electrostatic force of the charged raw resin as a driving force, and therefore, it is easily conceivable that the chargeability of the raw material is important in the case of a non-conductive raw resin as well. As a result of conducting an impedance analysis and drawing a Cole-Cole plot, it was found that the value of impedance at 0.1 Hz indicates the characteristics of the movement of ions of a molten resin (sample) caused by electrostatic induction. Thus, the absolute value of electrical impedance when a frequency of 0.1 Hz was applied was used as an indicator of chargeability. It should be noted that non-conductiveness as used herein refers to having an electrical impedance |Z| of $1.0 \times 10^{11} \Omega$ or greater.

The inventors of the present invention found that, with respect to melt electrospinning, when ultrafine fibers are to be produced using a non-conductive raw resin with high electrical resistance (volume-specific resistance), it is extremely important to control the chargeability of the raw resin. As a result of conducting various studies while focusing on the electrical properties of raw resins in the molten state, the inventors of the present invention found that, in the case where the absolute value of electrical impedance of a raw resin in a molten state is lower than the absolute value of electrical impedance of the raw resin in a solid state by a certain amount or greater, the amount of electric charge on the raw resin can be stably increased, which leads to an improvement in continuous spinnability. Specifically, it was found that ultrafine fibers can be stably obtained by using a raw resin that satisfies a relation (I) below.

$$A/B \geq 1.0 \times 10^2 \qquad (I)$$

wherein A represents the absolute value ($\Omega$) of electrical impedance of the raw resin at 50° C., and B represents the absolute value ($\Omega$) of electrical impedance of the raw resin at a temperature 50° C. higher than the melting point of the raw resin.

In the relation (I), a temperature of 50° C. is used for A to obtain the absolute value of electrical impedance of the raw resin in the solid state. Also, a temperature 50° C. higher than the melting point of the raw resin is used for B to improve the fluidity of the raw resin. As used herein, "melting point" refers to the temperature at which a melting peak is observed in differential scanning calorimetry (DSC), and refers to the temperature at which an endothermic peak is maximal in the case where a plurality of peaks are observed. In the present specification, the former (A) will hereinafter also be referred to as the "absolute value of electrical impedance of the raw resin when the raw resin is solid", and the latter (B) will also be referred to as the "absolute value of electrical impedance of the raw resin when the raw resin is melted".

The absolute values of electrical impedance of a raw resin is obtained by measuring the absolute value of electrical impedance of the raw resin in the solid state and the molten state within a constant temperature bath. Unless stated otherwise, "electrical impedance" as used herein means "the absolute value of electrical impedance at a frequency of 0.1 Hz". A specific method for measuring the electrical impedance is as follows.

Method for Measuring Electrical Impedance of Raw Resin

Figure 2:
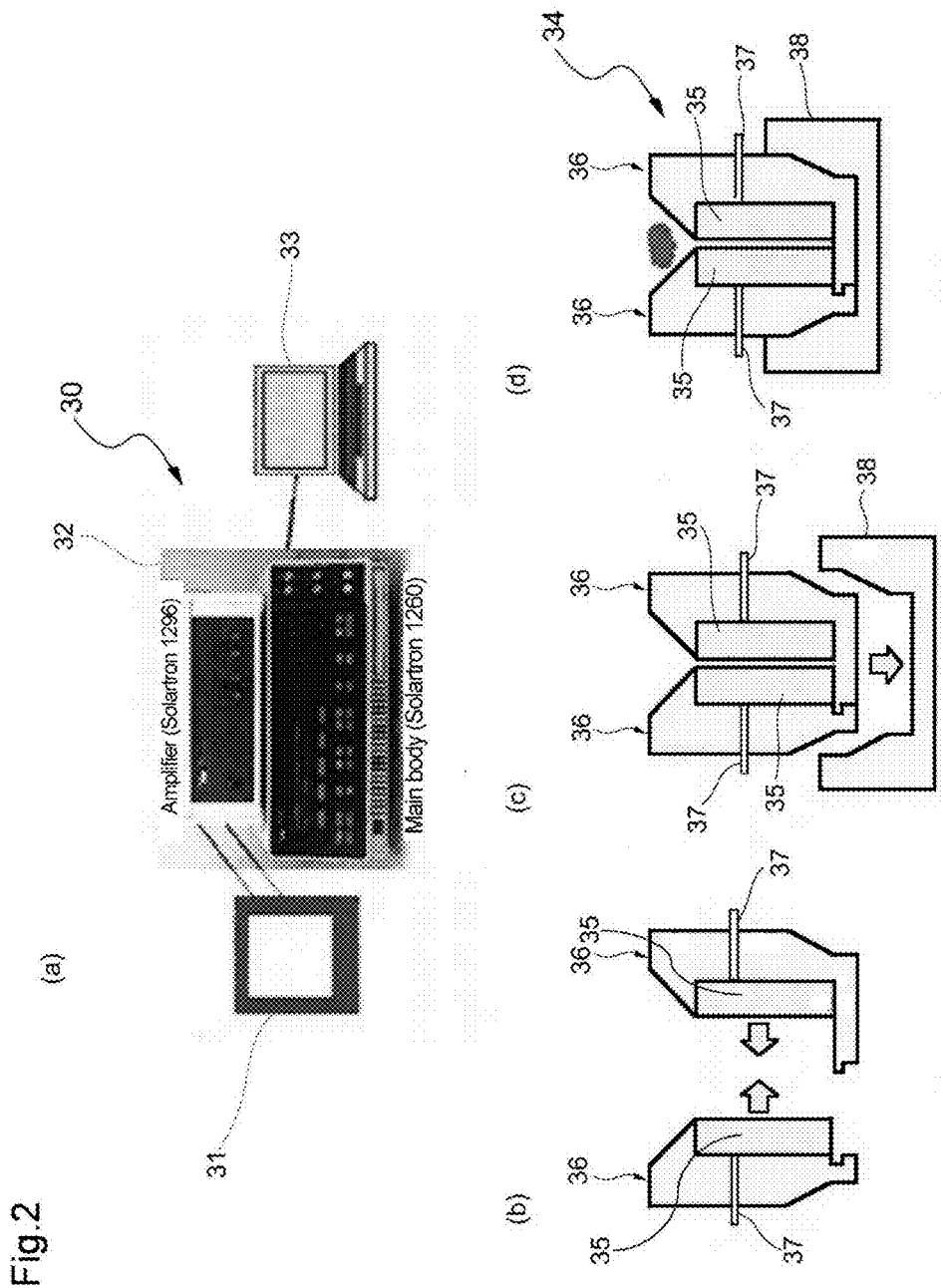
FIGS. 2(a) to 2(d) are schematic diagrams illustrating a method for measuring the absolute value of electrical impedance.

The electrical impedance is measured using a method illustrated in FIG. 2. As shown in FIG. 2(a), a measurement system 30 includes a constant temperature bath 31, a measuring instrument 32, and an analyzing computer 33. A common electric furnace or thermostatic oven of a forced circulation type or a natural convection type can be used as the constant temperature bath 31. A common frequency response analyzer can be used as the measuring instrument 32. For example, an impedance analyzer (1260 manufactured by Solartron) and a model-1296 dielectric constant measuring interface (manufactured by Solartron) can be used. A jig 34 shown in FIGS. 2(b) to 2(d), for example, can be used as a jig for measuring the electrical impedance of the raw resin in the solid state and the molten state within the constant temperature bath 31. In order to heat samples, the jig 34 includes a pair of cells (PEEK 450G) 36 which is made of polyetheretherketone (PEEK) and in which respective electrodes 35 are disposed, and a base 38. The use of the cells 36 enables heating measurement within the constant temperature bath 31. A terminal 37 is led out from each of the electrodes 35. The terminals 37 are connected to the measuring instrument 32. As shown in FIG. 2(c), the pair of cells 36 are arranged facing each other so that the electrodes 35 face each other, and are arranged and fixed in the base 38. In this state, the electrodes 35, which are arranged facing each other, are spaced apart from each other by a certain distance. The electrodes 35 in the cells 36 may be made of stainless steel, for example, and each have dimensions of 20 mm wide, 30 mm long, and 8 mm thick. The distance between the pair of electrodes 35 is 2 mm. The electrodes 35 excluding surfaces of the electrodes that face each other and upper surfaces that serve as loading surfaces for samples are completely covered with the cells made of PEEK. The applied voltage is set to be AC 0.1V for measurement at 210° C., that is, in the molten state, and is set to be AC 1V for measurement at 50° C., that is, in the solid state, and the applied frequency is set at 0.1 Hz. The measurement temperature is set at 50° C. for the solid state and 210° C. for the molten state (in the case where the melting point is 160° C.). The measurement is performed in an environment at 23° C. and 40% RH.

The procedure for measuring the electrical impedance is as follows.

(1) A polypropylene (PP) resin and an additive are weighed and mixed at a predetermined ratio so that the total weight is 5 g. For example, in the case where the additive is mixed in an amount of 5 mass %, 4.75 g of the resin and 0.25 g of the additive are mixed.

(2) The jig 34 is placed in the constant temperature bath 31. The temperature of the constant temperature bath 31 is increased to 210° C., and at the same time, the jig 34 is also heated.

(3) 5 g of the raw resin is melted (heated in the constant temperature bath 31 for about 10 minutes until the raw resin becomes transparent).

(4) As illustrated in FIG. 2(d), the molten raw resin is poured into the jig 34 and allowed to stand until the temperature becomes stabilized at 210° C. again.

(5) The temperature within the constant temperature bath 31 is gradually reduced from 210° C. to 50° C., and the electrical impedance is measured at each temperature. Five identical samples are prepared. The greatest measurement value and the smallest measurement value are discarded, and an average of the measurement values of the remaining three samples is obtained.

When the absolute value of electrical impedance of the raw resin in the molten state is low enough to allow the raw resin to be charged, and the absolute values of electrical impedance of the raw resin in the solid state and in the molten state differ from each other by a certain amount or greater, the raw resin can be successfully charged. Then, it is conceivable that the electric charge on the charged raw resin is less likely to flow out through fibers, the amount of electric charge on the raw resin in the discharging nozzle 12 can thus be maintained at a high level, and, as a result, ultrafine fibers can be stably continuously spun from the discharging nozzle 12.

The absolute value of electrical impedance of the raw resin when the raw resin is solid is preferably $5.0 \times 10^9 \Omega$ or greater and more preferably $1.0 \times 10^{10} \Omega$ or greater, from the viewpoint of making it less likely for the electric charge on the charged raw resin to flow out. On the other hand, the absolute value of electrical impedance of the raw resin when the raw resin is melted is preferably greater than $0 \Omega$ and $1.0 \times 10^{10} \Omega$ or less and more preferably greater than $0 \Omega$ and $9.0 \times 10^9 \Omega$ or less, from the viewpoint that it is preferable that the raw resin has an absolute value of electrical impedance that is low enough for the raw resin to be chargeable.

As a result of the absolute value of electrical impedance of the raw resin when the raw resin is melted being within the above-described range, the molten resin in a state in which its conductivity is relatively high can be charged by electrostatic induction via the leading end portion 14 of the melt electrospinning apparatus 10, and sparking and electric current leakage to the housing 11 via the molten resin can also be reduced.

Moreover, from the viewpoint that it is necessary that the absolute value of electrical impedance of the raw resin changes between the solid state and the molten state, a ratio A/B between the absolute value of electrical impedance A of the raw resin when the raw resin is solid and the absolute value of electrical impedance B of the raw resin when the raw resin is melted is preferably $1.0 \times 10^2$ or greater and more preferably $1.1 \times 10^2$ or greater. Moreover, from the viewpoint that the resin in the molten state can be easily charged, and ultrafine fibers can be easily obtained through electrospinning, the ratio A/B is preferably $1.0 \times 10^{10}$ or less and more preferably $1.0 \times 10^9$ or less. From these viewpoints, the value of A/B is preferably from $1.0 \times 10^2$ to $1.0 \times 10^{10}$ and more preferably from $1.1 \times 10^2$ to $1.0 \times 10^9$. What is important is the ratio A/B between the absolute value of electrical impedance of the raw resin when the raw resin is solid and the absolute value of electrical impedance of the raw resin when the raw resin is melted. Therefore, depending on the type of the raw resin, for example, the electrical impedance A of the raw resin when the raw resin is solid may be $1.0 \times 10^{12} \Omega$, and the electrical impedance B of the raw resin when the raw resin is melted may be $1.0 \times 10^{10} \Omega$; or alternatively, for example, the electrical impedance A of the raw resin when the raw resin is solid may be $1.0 \times 10^{10} \Omega$, and the electrical impedance B of the raw resin when the raw resin is melted may be $1.0 \times 10^{8} \Omega$.

In melt electrospinning, the raw resin is charged by induction. For this reason, the inventors of the present invention considered that, in order to control the absolute value of electrical impedance of the raw resin, it is necessary to reduce the absolute value of electrical impedance of the raw resin when the raw resin, which is an insulator, is melted. Thus, the inventors of the present invention conducted various studies from this viewpoint and consequently found that it is effective to blend a specific additive that enables the above-described ratio A/B to be satisfied into the raw resin. It was found that it is effective to use an additive having a salt structure as this specific additive. In this manner, even when a resin that constitutes the raw resin has a high absolute value of electrical impedance as is the case with polypropylene, for example, ultrafine fibers can be easily produced through melt electrospinning. That is to say, a wider variety of types of resins can be used as a component of the raw resin. When melt electrospinning of the present invention is adopted, even a raw resin that conventionally has been not easily charged in general and has been difficult to apply to melt electrospinning and a raw resin that has a high absolute value of electrical impedance in the solid state can be given the above-described properties with respect to the electrical impedance, so that these raw resins can be stably charged in melt electrospinning, and, consequently, can be made into ultrafine fibers.

The raw resins can be obtained by heating and melting any of various resins and the additive, followed by mixing the resin and the additive which have been heated and melted. Alternatively, a masterbatch that has been formed by kneading the additive into any of various resins in a separate step beforehand is used as the raw resin.

It is preferable to use a resin having a fiber forming property as the resin with which the additive is blended. Moreover, it is preferable to use a resin having a melting point as the resin with which the additive is blended. The resin having a melting point refers to a resin that, when heated, exhibits an endothermic peak caused by a phase change from solid to liquid prior to pyrolysis of the resin. Examples of the resin having a melting point that can be used in the present invention include polyolefin resins such as polyethylene, polypropylene, and ethylene-α-olefin copolymers; polyester resins such as polyethylene terephthalate and polybutylene terephthalate, polylactic acid, and liquid crystal polymers; polyamide resins; vinyl polymers such as polyvinyl chloride, polyvinylidene chloride, and polystyrene; acrylic polymers such as polyacrylic acid, polyacrylic esters, polymethacrylic acid, and polymethacrylic esters; nylon polymers such as nylon 6 and nylon 66, polyvinyl acetate, and polyvinyl acetate-ethylene copolymers. These resins can be used alone or in combination of two or more.

With regard to the additive, for example, various compounds having a salt structure which is ionized when melted can be used. In particular, compounds that have a salt structure having a melting point lower than or equal to the melting point of the resin that is used together with the additive are preferable as the additive. In order to adjust the melting point, it is also preferable to use a mixture of two or more of such compounds. An additive that is capable to form an ionized state within the raw resin is preferable in that it increases the amount of electric charge on the raw resin. Examples of such an additive include a charge control agent, a lubricant, an antistatic agent, a hydrophilizing agent, a surfactant, and a plasticizer. These additives can be used alone or in combination of two or more. In view of the dispersibility into the resin, the additive is preferably an organic salt, and more preferably a salt of an organic acid and an inorganic base. For example, a compound which has a quaternary ammonium base structure, a metallic soap which forms a metallic salt, and the like are preferable. Moreover, a compound (hereinafter, this compound will also be referred to as an "alkyl sulfonate") which has an alkyl group at an end and also has a sulfonate group at any position in a structure is also preferable.

An example of the compound which has a quaternary ammonium base structure is a styrene-acrylic resin that has a quaternary ammonium base structure. Examples of the metallic soap include fatty acid salts having a valence of two or more, such as Zn stearate, Mg stearate, Li stearate, Ca stearate, Ba stearate, Zn laurate, Ca laurate, Ba laurate, Ca ricinoleate, Ba ricinoleate, and Zn ricinoleate. The absolute value of electrical impedance of the raw resin when the raw resin is melted can be easily reduced by using these compounds, either alone or in combination of two or more, with the resin, and thus, a raw resin that is suitable for electrospinning can be obtained.

Examples of the alkyl sulfonate include alkylbenzene sulfonates (R-Ph-SO$_3$M), salts of higher alcohol sulfates (R—O—SO$_3$M), polyoxyethylene alkyl ether sulfates (R—O—(CH$_2$CH$_2$O)$_n$—SO$_3$M), alkyl sulfosuccinates (R—O—CO—C—C(—SO$_3$M)-O—CO-M), dialkyl sulfosuccinates (R—O—CO—C—C(—SO$_3$M)-O—CO—R), α-sulfofatty acid esters (R—CH(—SO$_3$M)-COOCH$_3$), α-olefin sulfonates (R—CH=CH—(CH$_2$)$_n$—SO$_3$M, R—CH(—OH)(CH$_2$)$_n$—SO$_3$M), acyl taurine salts (R—CO—NH—(CH$_2$)$_2$—SO$_3$M) acylalkyl taurine salts R—CO—N(—R')—(CH$_2$)$_2$—SO$_3$M, and alkanesulfonates (R—SO$_3$M). In these alkyl sulfonates, R represents an alkyl group, which has preferably 8 to 22 carbon atoms, more preferably 10 to 20 carbon atoms, and even more preferably 12 to 18 carbon atoms. R' also represents an alkyl group, which has preferably 5 or less carbon atoms. Ph represents an optionally substituted phenyl group. M represents a monovalent cation, which is preferably a metal ion and more preferably a sodium ion. "n" represents a number preferably from 6 to 24, more preferably from 8 to 22, and even more preferably from 10 to 20. These alkyl sulfonates may be used alone or may be used as a mixture of two or more. Among these alkyl sulfonates, it is preferable to use alkanesulfonates (R—SO$_3$M) in that the raw resin can be more stably charged. From this viewpoint, it is more preferable to use a mixture of two or more alkanesulfonates (R—SO$_3$M) with the alkyl groups having different numbers of carbon atoms. Alkanesulfonates (R—SO$_3$M) include primary alkanesulfonates in which the sulfonate group is bonded to an end of their structure and secondary alkanesulfonates in which the sulfonate group is bonded to a middle portion of their structure. It is preferable to use a secondary alkanesulfonate in that the raw resin can be even more stably charged, and it is more preferable to use a mixture of two or more secondary alkanesulfonates with the alkyl groups having different numbers of carbon atoms.

Among the above-described various additives, a compound having a salt structure that is in a solid state at room temperature (i.e., 25° C.) and has a melting point higher than or equal to room temperature and lower than or equal to the melting point of the raw resin or a mixture of two or more of such compounds is preferably used as the additive, because the effect of easily reducing the absolute value of electrical impedance of the raw resin when the raw resin is melted can be increased even further. For example, it was confirmed that, in the case where a raw resin was obtained by melt-kneading a compound having a salt structure with a polypropylene (PP) resin, the absolute value of electrical impedance of the raw resin was significantly reduced in a molten state at a temperature higher than or equal to the melting point of the polypropylene (PP) resin, and the absolute value of electrical impedance of the raw resin in a solid state at a temperature near room temperature was $1.0 \times 10^5$ or more times greater at the maximum than the absolute value of electrical impedance of the raw resin in the molten state. Thus, it was confirmed that as a result of the raw resin having a property of changing the absolute value of electrical impedance between the solid state and the molten state, actual spinning can be performed as expected, and the raw resin can be spun into ultrafine fibers.

In the cases where the additive is melt-kneaded with various types of resins and used, from the viewpoint of applying an appropriate amount of electric charge for electrospinning to the raw resin in the molten state, the ratio of the additive, which is mixed with the resin, to a sum of the resin and the additive, the sum being 100 parts by mass, is preferably 1 part by mass or greater, more preferably 1.5 parts by mass or greater, even more preferably 3 parts by mass or greater, and yet more preferably 5 parts by mass or greater. Moreover, from the viewpoint of obtaining ultrafine fibers through electrospinning, the ratio of the additive is preferably 45 parts by mass or less and more preferably 40 parts by mass or less. Moreover, the ratio of the additive, which is mixed with the resin, to a sum of the resin and the additive, the sum being 100 parts by mass, is preferably from 1 to 45 parts by mass, more preferably from 1.5 to 45 parts by mass, even more preferably from 3 to 40 parts by mass, and yet more preferably from 5 to 40 parts by mass. The ratio of the additive depends on the ionization degree of each additive. Therefore, in the case of an additive with a low ionization degree, it is advantageous to increase the amount of the additive that is added, in order to reduce the electrical impedance. Moreover, in the case of an additive with a high ionization degree, a sufficient reduction in the electrical impedance can be realized by adding only a small amount of the additive. If the amount of additive that is blended exceeds 50 parts by mass relative to the total mass of the resin and the additive, the ratio of the resin to the entire raw resin is small, and therefore, there are cases where ultrafine fibers cannot be stably obtained, depending on the type of the additive.

In the case where the additive is a compound which has a quaternary ammonium base structure, the ratio of the additive, which is mixed with the resin, to a sum of the resin and the additive, the sum being 100 parts by mass, is preferably 1 part by mass or greater, more preferably 3 parts by mass or greater, and even more preferably 5 parts by mass or greater. Moreover, the ratio of the additive is preferably 45 parts by mass or less and more preferably 40 parts by mass or less. The ratio of the additive, which is mixed with the resin, to a sum of the resin and the additive, the sum being 100 parts by mass, is preferably from 1 to 45 parts by mass, more preferably from 3 to 40 parts by mass, and even more preferably from 5 to 40 parts by mass.

In the case where the additive is a metallic soap, the ratio of the additive, which is mixed with the resin, to a sum of the resin and the additive, the sum being 100 parts by mass, is preferably 5 parts by mass or greater, more preferably 7 parts by mass or greater, and even more preferably 10 parts by mass or greater. Moreover, the ratio of the additive is preferably 45 parts by mass or less and more preferably 40 parts by mass or less. The ratio of the additive, which is mixed with the resin, to a sum of the resin and the additive, the sum being 100 parts by mass, is preferably from 5 to 45 parts by mass, more preferably from 7 to 40 parts by mass, and even more preferably from 10 to 40 parts by mass.

In the case where the additive is an alkyl sulfonate, the ratio of the additive, which is mixed with the resin, to a sum of the resin and the additive, the sum being 100 parts by mass, is preferably 1 part by mass or greater, more preferably 1.5 parts by mass or greater, and even more preferably 3 parts by mass or greater. Moreover, the ratio of the additive is preferably 45 parts by mass or less and more preferably 40 parts by mass or less. The ratio of the additive, which is mixed with the resin, to a sum of the resin and the additive, the sum being 100 parts by mass, is preferably from 1 to 45 parts by mass, more preferably from 1.5 to 40 parts by mass, and even more preferably from 3 to 40 parts by mass.

In the case where the additive is a styrene-acrylic resin which has a quaternary ammonium base structure, or in the case where the additive is an alkyl sulfonate, the decomposition temperature of the additive is preferably higher than or equal to the melting point of the raw resin, from the viewpoint of applying an appropriate amount of electric charge for electrospinning to the molten resin. The decomposition temperature of an additive means the 5% mass reduction temperature. The decomposition temperature of an additive is measured in the following manner.

The decomposition temperature is measured by thermogravimetry (TG) at a temperature increase rate of 10° C./min in a nitrogen atmosphere.

In the case where the additive is a styrene-acrylic resin which has a quaternary ammonium base structure, acrylic portions that partially constitute the main chain of the styrene-acrylic resin are preferably one or more selected from acrylic acid, acrylic acid esters, methacrylic acid, and methacrylic acid esters. In the case where an acrylic portion is an acrylic acid ester or a methacrylic acid ester, the ester portion is preferably a linear or branched alkyl group having 1 to 6 carbon atoms and more preferably a linear or branched alkyl group having 1 to 4 carbon atoms.

In the styrene-acrylic resin, styrene portions and acrlyic portions that constitute the main chain may be regularly arranged or may be randomly arranged. Alternatively, styrene portions may be arranged in blocks and acrylic portions may be arranged in blocks.

In the styrene-acrylic resin, the main chain may be constituted only by styrene portions and acrylic portions, or may be constituted by styrene portions, acrylic portions, and other copolymerization units.

The styrene-acrylic resin has a quaternary ammonium base. It is preferable that the quaternary ammonium base has a structure represented by a formula (1) below, because this enables a high amount of electric charge to be applied to a resin composition.

Chemical Formula 1

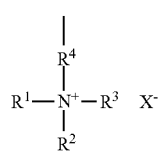

(1)

In the formula, $R^1$, $R^2$, and $R^3$ each independently represent a linear or branched alkyl group having 1 to 6 carbon atoms;

$R^4$ represents a direct bond or an alkylene group having 1 to 6 carbon atoms; and X represents a monovalent anion.

In the formula (1), $R^1$, $R^2$, and $R^3$ are preferably each independently a linear or branched alkyl group having 1 to 6 carbon atoms. Moreover, it is also preferable that two of $R^1$, $R^2$, and $R^3$ are groups of the same type, and the remaining one is a different type of group. With respect to the monovalent anion represented by $X^-$, inorganic ions such as an alkali metal ion and organic ions such as a benzenesulfonate ion and a p-toluenesulfonate ion are preferable.

Preferably, the quaternary ammonium base is bonded to the main chain of the styrene-acrylic resin as a side chain. The quaternary ammonium base may be bonded to a styrene portion, or may be bonded to an acrylic portion, of the main chain of the styrene-acrylic resin. In the case where the quaternary ammonium base is bonded to a styrene portion, the quaternary ammonium base may be bonded to an ethylene group portion, or may be bonded to a phenyl group portion, of the styrene portion. On the other hand, in the case where the quaternary ammonium base is bonded to an acrylic portion, the quaternary ammonium base may be bonded to an ethylene group portion, or may be bonded to a carboxyl group portion, of the acrylic portion.

A commercially-available product can also be used as the styrene-acrylic resin. Examples of such commercially-available product include Acrybase (registered trademark) FCA-201-PS, Acrybase (registered trademark) FCA-207P, and the like manufactured by Fujikura Kasei Co., Ltd.

In the present invention, in addition to the above-described additives, any various other types of additives that do not impair the properties with respect to the absolute value of electrical impedance can also be blended with the resin and used. For example, examples of the various other types of additives include an antioxidant, a neutralizer, a light stabilizer, an ultraviolet absorber, a lubricant, an antistatic agent, a metal deactivator, and a hydrophilizing agent. Examples of the antioxidant include phenol-based antioxidants, phosphite-based antioxidants, and thio-based antioxidants. Examples of the neutralizer include higher fatty acid salts such as calcium stearate and zinc stearate. Examples of the light stabilizer and the ultraviolet absorber include hindered amines, nickel complex compounds, benzotriazoles, and benzophenones. Examples of the lubricant include higher fatty amides such as stearamides. Examples of the antistatic agent include fatty acid partial esters such as glyceryl fatty acid monoesters. Examples of the metal deactivator include phosphones, epoxies, triazoles, hydrazides, and oxamides. Examples of the hydrophilizing agent include polyhydric alcohol fatty acid esters, ethylene oxide adducts, and nonionic surfactants such as amineamide surfactants.

In the production method of the present invention, the raw resin discharged from the discharging nozzle is highly charged. The amount of electric charge applied to the raw resin is preferably 2000 nC/g or greater, more preferably 3000 nC/g or greater, even more preferably 5000 nC/g or greater, and yet more preferably 10000 nC/g or greater, from the viewpoint of obtaining ultrafine fibers through electrospinning. The higher the amount of electric charge applied to the raw resin, the more preferable. The amount of electric charge applied to the raw resin is measured using a method that will be described later.

Fibers (nanofibers) that are obtained using the production method of the present invention can be used, as filament fibers or staple fibers, for fiber products such as woven and nonwoven fabrics. In the case of filament fibers, the fibers are continuous fibers having a fiber length of preferably 10 mm or greater, more preferably 50 mm or greater, and even more preferably 100 mm or greater. In addition to the above-described uses, the fibers can also be used for battery separators, electromagnetic shielding materials, high-performance filters, bioartificial devices, cell culture substrates, IC chips, organic EL, solar batteries, electrochromic display elements, photoelectric conversion elements, and the like.

The present invention has been described based on a preferred embodiment. However, the present invention is not limited to the foregoing embodiment.

With regard to the above-described embodiment, the present invention further discloses a method for producing ultrafine fibers below.

<1>

A method for producing ultrafine fibers, the method including:

forming an electric field between an discharging nozzle from which a raw resin is discharged and a charging electrode which is disposed apart from the discharging nozzle, supplying the raw resin which has been heated and melted into the electric field from the discharging nozzle to spin the raw resin, wherein the raw resin is a resin mixture which contains a resin having a melting point and an additive, and satisfies a relation (I) below:

$$A/B \geq 1.0 \times 10^2 \quad (I)$$

wherein A represents an absolute value ($\Omega$) of electrical impedance of the raw resin at 50° C., and B represents an absolute value ($\Omega$) of electrical impedance of the raw resin at a temperature 50° C. higher than a melting point of the raw resin.

<2>

The method for producing ultrafine fibers as set forth in clause <1>, wherein the discharging nozzle is earthed, and the charging electrode is connected to a high-voltage generator.

<3>

The method for producing ultrafine fibers as set forth in clause <1> or <2>, wherein a collecting portion which collects fibers of the raw resin is disposed separately from the discharging nozzle and the charging electrode, and the collecting portion is electrically connected.

<4>

The method for producing ultrafine fibers as set forth in any one of clauses <1> to <3>, wherein the additive has a salt structure.

<5>

The method for producing ultrafine fibers as set forth in any one of clauses <1> to <4>, wherein a compound having a salt structure with a melting point higher than or equal to room temperature and lower than or equal to the melting point of the raw resin is used as the additive.

<6>

The method for producing ultrafine fibers as set forth in any one of clauses <1> to <5>, wherein the additive has a decomposition temperature higher than or equal to the melting point of the raw resin.

<7>
The method for producing ultrafine fibers as set forth in any one of clauses <1> to <6>, wherein the additive is a compound having a salt structure which is ionized when melted.

<8>
The method for producing ultrafine fibers as set forth in any one of clauses <1> to <7>, wherein the additive is a compound having a salt structure with a melting point lower than or equal to the melting point of the resin that is used together with the additive.

<9>
The method for producing ultrafine fibers as set forth in any one of clauses <1> to <8>, wherein the additive is capable to form an ionized state within the raw resin.

<10>
The method for producing ultrafine fibers as set forth in any one of clauses <1> to <9>, wherein the additive is one or two or more types of additives selected from a charge control agent, a lubricant, an antistatic agent, a hydrophilizing agent, a surfactant, and a plasticizer.

<11>
The method for producing ultrafine fibers as set forth in any one of clauses <1> to <10>, wherein the additive is an organic salt.

<12>
The method for producing ultrafine fibers as set forth in any one of clauses <1> to <11>, wherein the additive is any one of
a compound which has a quaternary ammonium base structure,
a metallic soap which forms a metallic salt, and
a compound which has an alkyl group at an end and has a sulfonate group at any position in a structure.

<13>
The method for producing ultrafine fibers as set forth in clause <12>, wherein the compound which has a quaternary ammonium base structure is a styrene-acrylic resin which has a quaternary ammonium base structure.

<14>
The method for producing ultrafine fibers as set forth in any one of clauses <1> to <11>, wherein the additive is a salt of an organic acid and an inorganic base.

<15>
The method for producing ultrafine fibers as set forth in clause <14>, wherein the additive is a fatty acid salt having a valence of two or more.

<16>
The method for producing ultrafine fibers as set forth in clause <15>, wherein the additive is one or two or more compounds selected from Zn stearate, Mg stearate, Li stearate, Ca stearate, Ba stearate, Zn laurate, Ca laurate, Ba laurate, Ca ricinoleate, Ba ricinoleate, and Zn ricinoleate.

<17>
The method for producing ultrafine fibers as set forth in clause <14>, wherein the additive is a compound which has an alkyl group at an end and has a sulfonate group at any position in a structure.

<18>
The method for producing ultrafine fibers as set forth in clause <17>, wherein the compound is any one of an alkylbenzene sulfonate, a salt of higher alcohol sulfate, a polyoxyethylene alkyl ether sulfate, an alkyl sulfosuccinate, a dialkyl sulfosuccinate, an α-sulfofatty acid ester, an α-olefin sulfonate, an acyl taurine salt, an acylalkyl taurine salt, and an alkanesulfonate.

<19>
The method for producing ultrafine fibers as set forth in clause <17>, wherein the additive is an alkanesulfonate.

<20>
The method for producing ultrafine fibers as set forth in clause <19>, wherein the additive is sodium alkanesulfonate.

<21>
The method for producing ultrafine fibers as set forth in any one of clauses <1> to <20>, wherein a masterbatch that has been formed by kneading the additive into any of various resins in a separate step beforehand is used as the raw resin.

<22>
The method for producing ultrafine fibers as set forth in any one of clauses <1> to <21>, wherein the absolute value of electrical impedance of the raw resin at 50° C. is preferably $5.0 \times 10^9 \Omega$ or greater and more preferably $1.0 \times 10^{10} \Omega$ or greater.

<23>
The method for producing ultrafine fibers as set forth in any one of clauses <1> to <22>, wherein, the absolute value of electrical impedance of the raw resin at a temperature 50° C. higher than the melting point of the raw resin is preferably greater than $0\Omega$ and $1.0 \times 10^{10} \Omega$ or less and more preferably greater than $0\Omega$ and $9.0 \times 10^9 \Omega$ or less.

<24>
The method for producing ultrafine fibers as set forth in any one of clauses <1> to <23>, wherein A/B is preferably $1.0 \times 10^2$ or greater and more preferably $1.1 \times 10^2$ or greater, is preferably $1.0 \times 10^{10}$ or less and more preferably $1.0 \times 10^9$ or less, and is preferably from $1.0 \times 10^2$ to $1.0 \times 10^{10}$ and more preferably from $1.1 \times 10^2$ to $1.0 \times 10^9$.

<25>
The method for producing ultrafine fibers as set forth in any one of clauses <1> to <24>, wherein a ratio of the additive relative to a sum of the resin and the additive, the sum being 100 parts by mass, is preferably 1 part by mass or greater, more preferably 1.5 parts by mass or greater, even more preferably 3 parts by mass or greater, and yet more preferably 5 parts by mass or greater, is preferably 45 parts by mass or less and more preferably 40 parts by mass or less, and is preferably from 1 to 45 parts by mass, more preferably from 1.5 to 45 parts by mass, even more preferably from 3 to 40 parts by mass, and yet more preferably from 5 to 40 parts by mass.

<26>
The method for producing ultrafine fibers as set forth in any one of clauses <1> to <25>, the method further including:
preparing the raw resin by heating and melting the resin and the additive, followed by mixing the resin and the additive which are heated and melted; and
blowing a heated fluid toward the raw resin discharged from the discharging nozzle to entrain ultrafine fibers generated from the raw resin.

<27>
The method for producing ultrafine fibers as set forth in any one of clauses <1> to <26>, wherein the discharging nozzle includes a nozzle base and a leading end portion, and
the leading end portion is configured to be charged by electrostatic induction from the charging electrode to which a high voltage is applied.

<28>
The method for producing ultrafine fibers as set forth in any one of clauses <1> to <27>, wherein the discharging nozzle includes a nozzle base and a leading end portion, and
the nozzle base and the leading end portion are electrically insulated from each other with an insulating member.

<29>

The method for producing ultrafine fibers as set forth in any one of clauses <1> to <28>, wherein the discharging nozzle includes a nozzle base and a leading end portion, and the leading end portion is provided with an earth connection, and a voltage is applied to the charging electrode that is positioned in such a manner to face the leading end portion.

<30>

The method for producing ultrafine fibers as set forth in any one of clauses <1> to <29>, wherein an amount of electric charge applied to the raw resin is preferably 2000 nC/g or greater, more preferably 3000 nC/g or greater, even more preferably 5000 nC/g or greater, and yet more preferably 10000 nC/g or greater.

EXAMPLES

Hereinafter, the present invention will be described in greater detail using examples. However, the scope of the present invention is not limited to the examples below. In the following description, "%" means "mass %" unless otherwise specified.

Example 1

Ultrafine fibers composed of a raw resin (resin composition) in which polypropylene (PP) and an additive were mixed were produced using the melt electrospinning apparatus 10 shown in FIG. 1. MF650Y (having a melting point of 160° C.) from PolyMirae was used as the polypropylene. Acrybase (registered trademark) FCA-201-PS from Fujikura Kasei Co., Ltd., which is a styrene-acrylic resin having a quaternary ammonium base, was used as the additive. This additive had a decomposition temperature of 276° C. The additive was blended in an amount of 5% relative to the total mass of the polypropylene resin and the additive. The electrical impedance of the raw resin was as shown in Table 1. The nozzle base 13 and the leading end portion 14 of the melt electrospinning apparatus 10 were made of stainless steel (SUS303). The heating temperature of the cylinder in the housing 11 of the melt electrospinning apparatus 10 was 220° C. The raw resin was melt-kneaded within the housing 11. The molten raw resin was discharged from the leading end portion 14 at a discharging rate of 1 g/min. The leading end portion 14 was provided with an earth connection. A high voltage of 20 kV was applied to the flat plate-shaped charging electrode 21 facing the leading end portion 14, by the high-voltage generator 22. The leading end portion 14 was disposed so as to face a central portion of the flat plate-shaped charging electrode 21. The flat plate-shaped charging electrode 21 had a rectangular shape with dimensions of 80 mm×80 mm, had a thickness of 10 mm, and was made of stainless steel (SUS303). The distance between the leading end portion 14 and the charging electrode 21 was set at 35 mm. The jetting portion 23 was disposed between the leading end portion 14 and the charging electrode 21, and an air stream heated to 340° C. was jetted from the jetting portion 23 at a flow rate of 200 L/min. Fibers entrained by the air stream accumulated on the surface of the collecting sheet 24 composed of a polypropylene film. The collecting sheet 24 was transported by the transport conveyor 25 circulating at a rate of 0.5 m/min. A high voltage was applied to the collecting electrode 27 by the high-voltage generator 26. In this manner, ultrafine fibers were produced. The produced ultrafine fibers had an average fiber diameter of 1070 nm.

Examples 2 to 4

Ultrafine fibers were produced in the same manner as in Example 1 except that the additive was replaced with additives shown in Table 1. The produced ultrafine fibers had an average fiber diameter of 2040 nm. The additive in Example 2 had a decomposition temperature of 349° C., the additive in Example 3 had a decomposition temperature of 315° C., and the additive in Example 4 had a decomposition temperature of 329° C.

Example 5

Ultrafine fibers were produced in the same manner as in Example 2 except that the blend amount of the additive in Example 2 was changed to the blend amount shown in Table 1. The produced ultrafine fibers had an average fiber diameter of 1270 nm.

Comparative Example 1

Ultrafine fibers were produced in the same manner as in Example 1 except that the additive in Example 1 was not used.

Comparative Examples 2 and 3

Ultrafine fibers were produced in the same manner as in Example 1 except that the additive in Example 1 was replaced with additives shown in Table 2.

Comparative Example 4

Ultrafine fibers were produced in the same manner as in Example 2 except that the blend amount of the additive in Example 2 was changed to the blend amount shown in Table 2.

Comparative Example 5

Ultrafine fibers were produced in the same manner as in Example 3 except that the blend amount of the additive in Example 3 was changed to the blend amount shown in Table 2.

Evaluation 1

In the examples and the comparative examples, the electrical impedance was measured using the method illustrated in FIG. 2. As shown in FIG. 2(a), the measurement system 30 was constituted by the constant temperature bath 31, the measuring instrument 32, and the analyzing computer 33. A common thermostatic oven of a natural convection type was used as the constant temperature bath 31. An impedance analyzer (1260 manufactured by Solartron) and a model-1296 dielectric constant measuring interface (manufactured by Solartron) were used as the measuring instrument 32. The jig 34 shown in FIGS. 2(b) to 2(d) was used as a jig for measuring the electrical impedance of the raw resin in the solid state and the molten state within the constant temperature bath 31. The capacitance of the jig 34 in an empty state in which no sample was loaded was measured and found to be 6.7 pF. The applied voltage was AC 0.1V for measurement at 210° C. and AC 1V for measurement at 50° C., and the applied frequency was 0.1 Hz. The measurement temperature was set at 50° C. for the solid state and 210° C. for the molten state, because the PP had a melting point of 160° C. The measurement was performed in an environment at 23° C. and 40% RH.

The procedure for measuring the electrical impedance was as follows.

(1) The polypropylene (PP) resin and the additive were weighed and mixed at a predetermined ratio so that the total weight was 5 g. For example, in the case where the additive was mixed in an amount of 5%, 4.75 g of the resin and 0.25 g of the additive were mixed.

(2) The jig 34 was placed in the constant temperature bath 31. The temperature of the constant temperature bath 31 was increased to 210° C., and at the same time, the jig 34 was also heated.

(3) 5 g of the raw resin was melted (heated in the constant temperature bath 31 for about 10 minutes until the raw resin became transparent).

(4) As illustrated in FIG. 2(d), the molten raw resin was poured into the jig 34, and was allowed to stand until the temperature was stabilized at 210° C. again.

(5) The temperature in the constant temperature bath 31 was reduced from 210° C. to 50° C., and the absolute value of electrical impedance was measured at each temperature. Five identical samples were prepared. The greatest measurement value and the smallest measurement value were discarded, and an average of the measurement values of the remaining three samples was obtained. Tables 1 and 2 show the results.

Evaluation 2

Figure 3:
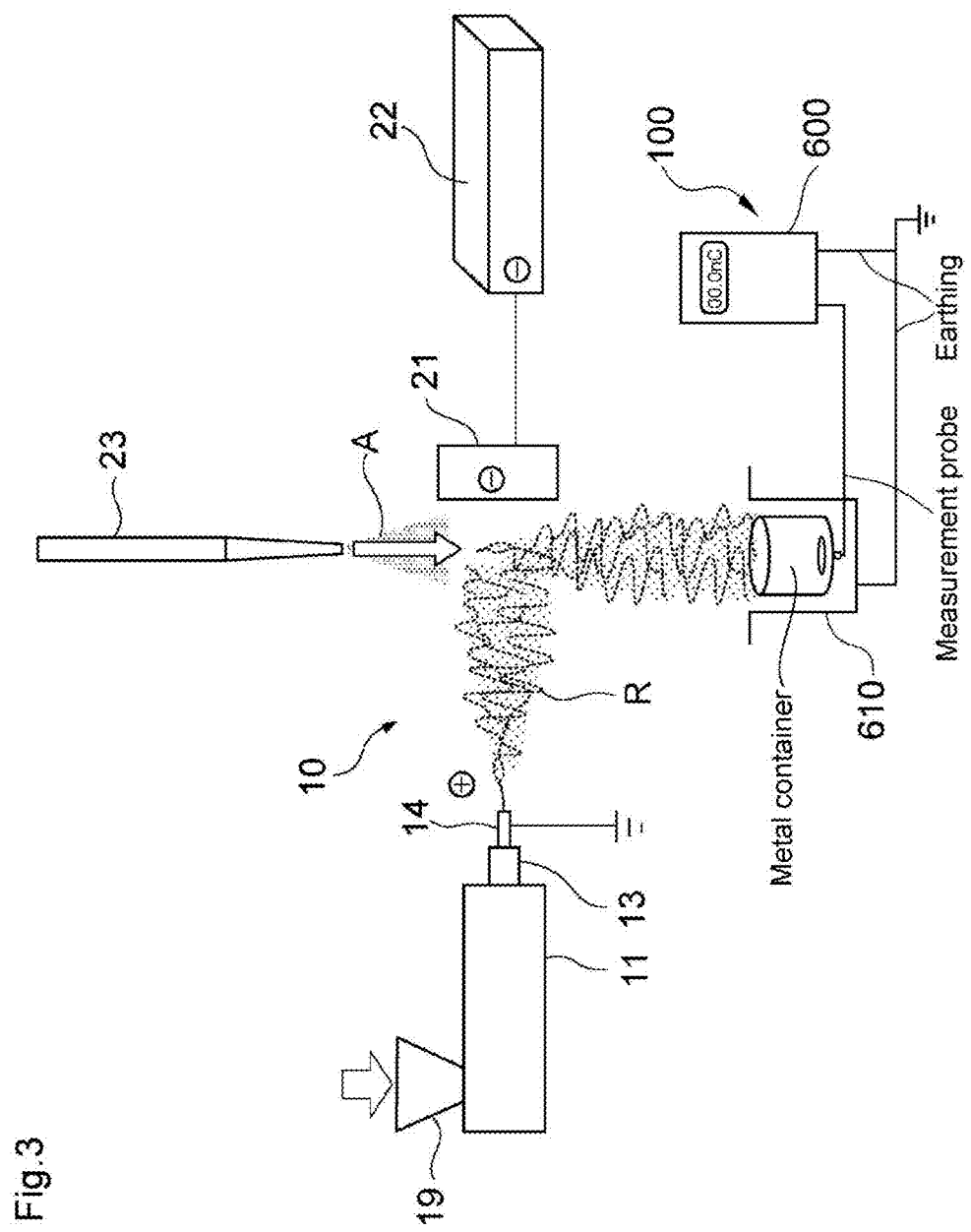
FIG. 3 is a schematic diagram illustrating a method for measuring the amount of electric charge using a production apparatus shown in FIG. 1.

In the examples and the comparative examples, the amount of electric charge on the raw resin when the raw resin was charged was measured. The amount of electric charge was measured using a charge amount evaluation apparatus 100 shown in FIG. 3. The amount of electric charge was measured as follows: a charged raw resin in a molten state was collected for one minute into a metal container that was placed in a Faraday cage 610 (KQ1400 manufactured by Kasuga Denki, Inc.), and the amount of electric charge was measured using a Coulomb meter 600 (NK-1002A manufactured by Kasuga Denki, Inc.) that was connected to the Faraday cage. The measurement was performed under the conditions below. Tables 1 and 2 show the results.

Applied voltage: 20 kV
Resin discharging rate: 1 g/min
Resin heating temperature: 190° C. (leading end portion)
Temperature of heated air: 340° C.
Measurement environment: 27° C., 50% RH Evaluation 3

In the examples and the comparative examples, whether a continuous charging operation of the melt electrospinning apparatus was performed well or not, that is, the spinnability was evaluated. The continuous charging operation was performed as follows: for each of the raw resins containing the respective additives shown in Tables 1 and 2, ultrafine fibers were continuously produced for 5 minutes under the same conditions as in Example 1. The evaluation was performed using the following criteria. Tables 1 and 2 show the results.

A: The molten raw resin was able to be continuously electrospun.

B: The molten raw resin was not able to be continuously electrospun.

TABLE 1

| | | | Ex. 1 | Ex. 2 | Ex. 3 | Ex. 4 | Ex. 5 |
|---|---|---|---|---|---|---|---|
| Raw resin | Resin | Type | PP | PP | PP | PP | PP |
| | | Composition (parts by mass) | 95.0 | 95.0 | 95.0 | 95.0 | 80.0 |
| | Additive | Type | Quaternary ammonium base Styrene-acrylic resin | Metallic soap (Zn stearate) | Metallic soap (Zn laurate) | Metallic soap (Mg stearate) | Metallic soap (Zn stearate) |
| | | Composition (parts by mass) | 5.0 | 5.0 | 5.0 | 5.0 | 20.0 |
| Absolute value ($\Omega$) of electrical impedance | A [T = 50° C. (0.1 Hz)] | | $9.0 \times 10^{11}$ | $2.6 \times 10^{11}$ | $3.0 \times 10^{11}$ | $4.0 \times 10^{11}$ | $1.1 \times 10^{11}$ |
| | B [T = 210° C. (0.1 Hz)] | | $3.0 \times 10^{7}$ | $2.7 \times 10^{7}$ | $6.0 \times 10^{8}$ | $3.7 \times 10^{9}$ | $6.0 \times 10^{5}$ |
| Ratio A/B between absolute values of electrical impedance | | | $3.0 \times 10^{4}$ | $9.6 \times 10^{3}$ | $5.0 \times 10^{2}$ | $1.1 \times 10^{2}$ | $1.8 \times 10^{5}$ |
| Amount of electric charge (nC/g) | | | 7288 | 2214 | 2899 | 3157 | 6137 |
| Spinnability | | | A | A | A | A | A |

TABLE 2

| | | | Com. Ex. 1 | Com. Ex. 2 | Com. Ex. 3 | Com. Ex. 4 | Com. Ex. 5 |
|---|---|---|---|---|---|---|---|
| Raw resin | Resin | Type | PP | PP | PP | PP | PP |
| | | Composition (parts by mass) | 100.0 | 95.0 | 95.0 | 99.0 | 98.0 |
| | Additive | Type | — | Stearyl alcohol EO adduct | Amine ester | Metallic soap (Zn stearate) | Metallic soap (Zn laurate) |
| | | Composition (parts by mass) | 0.0 | 5.0 | 5.0 | 1.0 | 2.0 |
| Absolute value ($\Omega$) of electrical impedance | A [T = 50° C (0.1 Hz)] | | $2.1 \times 10^{11}$ | $2.0 \times 10^{11}$ | $1.5 \times 10^{11}$ | $1.8 \times 10^{11}$ | $2.2 \times 10^{11}$ |
| | B [T = 210° C. (0.1 Hz)] | | $3.7 \times 10^{10}$ | $3.0 \times 10^{10}$ | $1.0 \times 10^{10}$ | $2.1 \times 10^{9}$ | $3.4 \times 10^{9}$ |
| Ratio A/B between absolute values of electrical impedance | | | $5.7 \times 10^{0}$ | $6.7 \times 10^{0}$ | $1.5 \times 10^{1}$ | $8.6 \times 10^{1}$ | $6.4 \times 10^{1}$ |

TABLE 2-continued

|  | Com. Ex. 1 | Com. Ex. 2 | Com. Ex. 3 | Com. Ex. 4 | Com. Ex. 5 |
|---|---|---|---|---|---|
| Amount of electric charge (nC/g) | 9 | 65 | 33 | 129 | 481 |
| Spinnability | B | B | B | B | B |

As is clear from the results shown in Tables 1 and 2, according to the examples, a raw resin can be highly charged. Moreover, it is clear that a molten raw resin can be continuously discharged and spun. In particular, in Example 1, in which the additive was the styrene-acrylic resin having a quaternary ammonium salt as a functional group, the raw resin in the molten state had a high amount of electric charge, and the fiber diameter of the obtained fibers was as small as 1070 nm. It is thus clear that ultrafine fibers were obtained. A comparison among Examples 2 and 5 and Comparative Example 4, in which the additives were the metallic soaps, shows that, as a result of setting the blend amount of additive at 5 mass % or greater, the amount of electric charge on the raw resin was increased, and the fiber diameter of the obtained fibers was as small as 2040 nm or less. It is thus clear that ultrafine fibers were obtained. In contrast, in each of Comparative Examples 1 to 3, since the raw resin did not contain, as the additive, a compound having a salt structure which is ionized when melted, the raw resin in the molten state had a low amount of electric charge, and A/B was $1.0 \times 10^2$ or less. It is clear that continuous spinning was therefore not able to be performed.

Example 6

Mersolat H95 (registered trademark) from Lanxess was used as the additive. Mersolat H95 is a mixture of secondary sodium alkanesulfonates, and the alkyl groups thereof had an average of 14.5 carbon atoms. This additive had a decomposition temperature of 402° C. Otherwise, ultrafine fibers were produced in the same manner as in Example 1. The produced ultrafine fibers had an average fiber diameter of 550 nm.

Examples 7 to 9 and Comparative Example 6

Ultrafine fibers were produced in the same manner as in Example 6 except that the blend amount of the additive in Example 6 was changed to the blend amounts shown in Table 3. The produced ultrafine fibers had a fiber diameter of 680 nm (Example 7), 870 nm (Example 8), and 1280 nm (Example 9). In Comparative Example 6, spinning was not able to be performed.

Example 10

Ultrafine fibers were produced in the same manner as in Example 6 except that a polyester (having a molecular weight of about 20000 and a melting point of 84° C.) composed of sebacic acid and 1,2-dodecanediol was synthesized and used as the raw resin, and Mersolat H95 (registered trademark) from Lanxess was used as the additive. The produced ultrafine fibers had an average fiber diameter of 640 nm.

With respect to the obtained ultrafine fibers, Evaluations 1 to 3 above were performed. Table 3 below shows the results.

TABLE 3

|  |  |  | Ex. 6 | Ex. 7 | Ex. 8 | Ex. 9 | Ex. 10 | Com. Ex. 6 |
|---|---|---|---|---|---|---|---|---|
| Raw resin | Resin | Type | PP | PP | PP | PP | Polyester | PP |
|  |  | Composition (parts by mass) | 95.0 | 97.0 | 98.5 | 99.0 | 95.0 | 99.9 |
|  | Additive | Type | Sodium alkane-sulfonate | Sodium alkane-sulfonate | Sodium alkane-sulfonate | Sodium alkane-sulfonate | Sodium alkane-sulfonate | Sodium alkane-sulfonate |
|  |  | Composition (parts by mass) | 5.0 | 3.0 | 1.5 | 1.0 | 5.0 | 0.1 |
| Absolute value (Ω) of electrical impedance | A [T = 50° C. (0.1 Hz)] |  | $8.0 \times 10^{10}$ | $3.2 \times 10^{11}$ | $2.1 \times 10^{11}$ | $1.8 \times 10^{11}$ | $1.1 \times 10^{9}$ | $2.0 \times 10^{11}$ |
|  | B [T = 210° C. (0.1 Hz)] |  | $3.8 \times 10^{8}$ | $2.2 \times 10^{9}$ | $1.9 \times 10^{9}$ | $1.7 \times 10^{9}$ | $2.3 \times 10^{6}$ | $1.6 \times 10^{10}$ |
| Ratio A/B between absolute values of electrical impedance |  |  | $2.1 \times 10^{2}$ | $1.4 \times 10^{2}$ | $1.1 \times 10^{2}$ | $1.0 \times 10^{2}$ | $4.8 \times 10^{2}$ | $1.3 \times 10^{1}$ |
| Amount of electric charge (nC/g) |  |  | 39911 | 34473 | 24248 | 20620 | 7671 | 131 |
| Spinnability |  |  | A | A | A | A | A | B |

As is clear from the results shown in Table 3, according to the examples, a raw resin can be highly charged. Moreover, it is clear that the molten raw resin can be continuously discharged and spun. Furthermore, as is clear from the results of Example 10, even when polyester is used as the raw resin, the raw resin can be highly charged. Moreover, it is clear that the molten raw resin can be continuously discharged and spun.

INDUSTRIAL APPLICABILITY

According to the present invention, it is possible to reduce the absolute value of electrical impedance of a raw resin in melt electrospinning and stably charge the raw resin, so that spinning of ultrafine fibers, which are difficult to obtain with a conventional method, can be continuously performed.

The invention claimed is:
1. A method for producing ultrafine fibers, the method comprising:
   forming an electric field between a discharging nozzle from which a raw resin is discharged and a charging electrode which is disposed apart from the discharging nozzle, and supplying the raw resin which has been heated and melted into the electric field from the discharging nozzle to spin the raw resin, wherein the raw resin is a resin mixture which contains a resin having a melting point and an additive, and satisfies a relation (I) below:

$$A/B \geq 1.0 \times 10^2 \qquad (I)$$

where A represents an absolute value (Ω) of electrical impedance of the raw resin at 50° C. when measured with the raw resin in a solid state within a constant temperature bath, and B represents an absolute value (Ω) of electrical impedance of the raw resin at a temperature 50° C. higher than a melting point of the raw resin when measured with the raw resin in a molten state within the constant temperature bath, and wherein the additive is a compound having a salt structure which is ionized when melted in association with the melting of the raw resin.

2. The method for producing ultrafine fibers according to claim 1, wherein the discharging nozzle is earthed, and the charging electrode is connected to a high-voltage generator.

3. The method for producing ultrafine fibers according to claim 1, wherein a collecting portion which collects fibers of the raw resin is disposed separately from the discharging nozzle and the charging electrode, and the collecting portion is electrically connected.

4. The method for producing ultrafine fibers according to any claim 1, wherein the method further comprising:
preparing the raw resin by heating and melting the resin and the additive, followed by mixing the resin and the additive which are heated and melted; and
blowing a heated fluid toward the raw resin discharged from the discharging nozzle to entrain ultrafine fibers generated from the raw resin.

5. The method for producing ultrafine fibers according to any claim 1, wherein the additive has a decomposition temperature higher than or equal to the melting point of the raw resin.

6. The method for producing ultrafine fibers according to claim 1, wherein the additive is an organic salt.

7. The method for producing ultrafine fibers according to claim 1,
wherein the additive is any one of
a compound which has a quaternary ammonium base structure,
a metallic soap which forms a metallic salt, and
a compound which has an alkyl group at an end and has a sulfonate group at any position in a structure.

8. The method for producing ultrafine fibers according to claim 6, wherein the additive is a salt of an organic acid and an inorganic base.

9. The method for producing ultrafine fibers according to claim 8, wherein the additive is a fatty acid salt having a valence of two or more.

10. The method for producing ultrafine fibers according to claim 9, wherein the additive is one or two or more compounds selected from Zn stearate, Mg stearate, Li stearate, Ca stearate, Ba stearate, Zn laurate, Ca laurate, Ba laurate, Ca ricinoleate, Ba ricinoleate, and Zn ricinoleate.

11. The method for producing ultrafine fibers according to claim 8, wherein the additive is a compound which has an alkyl group at an end and has a sulfonate group at any position in a structure.

12. The method for producing ultrafine fibers according to claim 11 wherein the additive is an alkyl sulfonate.

13. The method for producing ultrafine fibers according to claim 11, wherein the compound is any one of an alkylbenzene sulfonate, a salt of higher alcohol sulfate, a polyoxyethylene alkyl ether sulfate, an alkyl sulfosuccinate, a dialkyl sulfosuccinate, an a-sulfofatty acid ester, an a-olefin sulfonate, an acyl taurine salt, an acylalkyl taurine salt, and an alkanesulfonate.

14. The method for producing ultrafine fibers according to claim 1, wherein an absolute value of electrical impedance of the raw resin at 50° C. is $5.0 \times 10^9 \Omega$ or greater.

15. The method for producing ultrafine fibers according to claim 1, wherein the absolute value of electrical impedance of the raw resin at a temperature 50° C. higher than the melting point of the raw resin is greater than 0Ω and $1.0 \times 10^{10} \Omega$ or less.

16. The method for producing ultrafine fibers according to claim 1, wherein A/B is from $1.0 \times 10^2$ to $1.0 \times 10^{10}$.

17. The method for producing ultrafine fibers according to claim 1, wherein a ratio of the additive relative to a sum of the resin and the additive, the sum being 100 parts by mass, is from 1 to 45 parts by mass.

18. The method for producing ultrafine fibers according to claim 1, wherein the discharging nozzle comprises a nozzle base and a leading end portion, and
the nozzle base and the leading end portion are electrically insulated from each other with an insulating member.

19. The method for producing ultrafine fibers according to claim 1, wherein the raw resin is one or two or more compounds selected from polyolefin resins and polyester resins, and a ratio of the additive relative to a sum of the resin and the additive, the sum being 100 parts by mass, is from 1 to 45 parts by mass.

20. The method for producing ultrafine fibers according to claim 1, wherein the compound having the salt structure is in the solid state at 25° C. and has a melting point greater than 25° C. and less than or equal to the melting point of the raw resin.

* * * * *